United States Patent [19]

Petroff et al.

[11] Patent Number: 5,169,872
[45] Date of Patent: Dec. 8, 1992

[54] PROCESS FOR PREPARING RIGID POLYURETHANE AND POLYISOCYANURATE FOAMS HAVING ENHANCED BENEFITS

[75] Inventors: Lenin J. Petroff, Bay City; James D. Thornsberry, Midland, both of Mich.

[73] Assignee: Dow Corning Corporation, Midland, Mich.

[21] Appl. No.: 880,879

[22] Filed: May 11, 1992

[51] Int. Cl.$^5$ .............................. C08J 9/12; C08J 9/14
[52] U.S. Cl. .................................... 521/112; 521/110; 521/111; 528/15
[58] Field of Search ........................ 521/110, 112, 111

[56] References Cited

U.S. PATENT DOCUMENTS 3,663,468  5/1972  Haluska ........................ 521/111
4,751,251  6/1988  Thornberry .................... 521/112

Primary Examiner—Morton Foelak
Attorney, Agent, or Firm—Robert L. McKellar

[57] ABSTRACT

What is disclosed is a process for obtaining polyurethane foams having enhanced benefits. The invention disclosed herein provides a system flowability of the reacting foam mixture to give foams with an insulating capablity equal to the foams that are provided by chlorofluorocarbon blown system, while doing away with the chlorofluorocarbons.

1 Claim, 1 Drawing Sheet

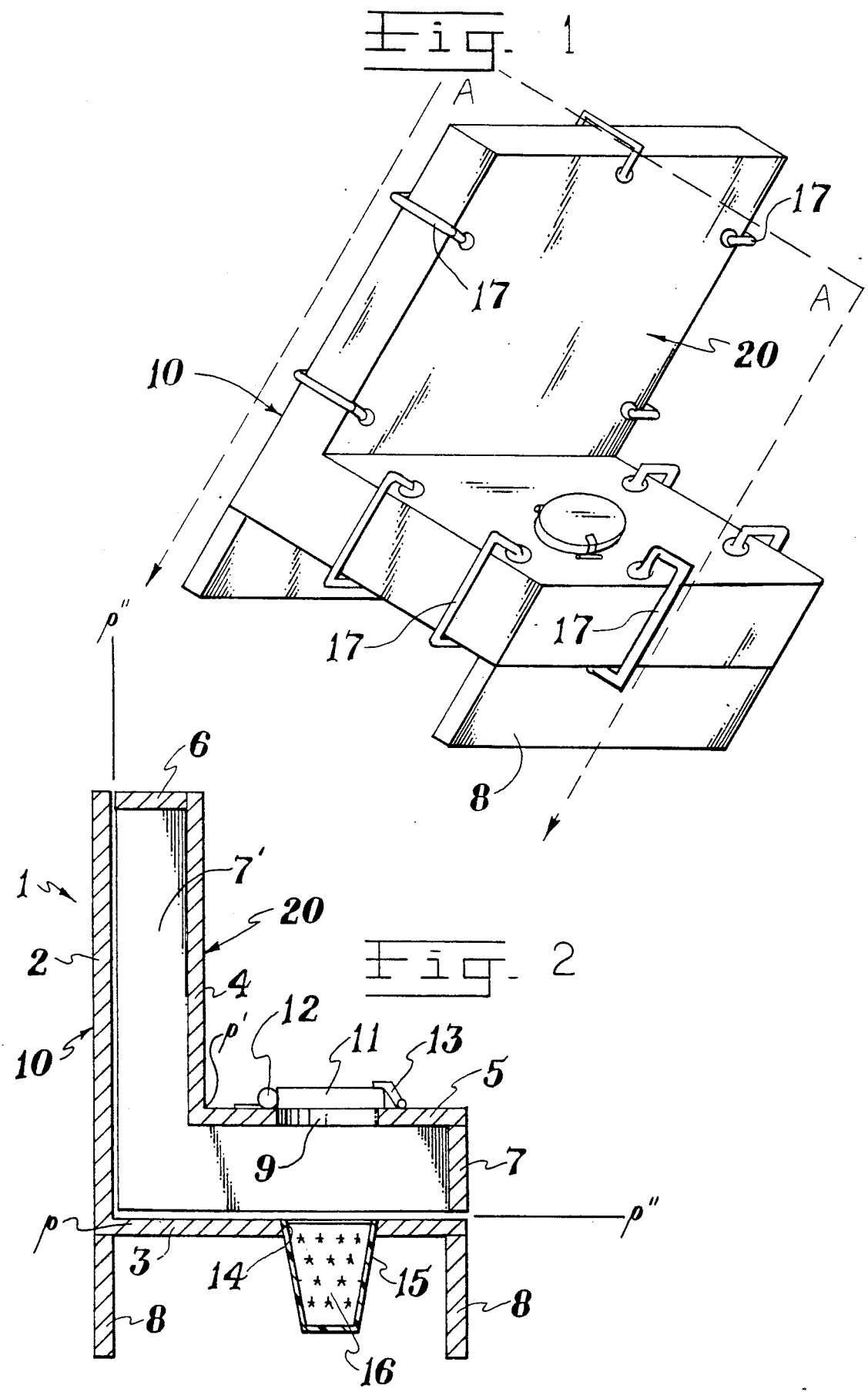

PROCESS FOR PREPARING RIGID POLYURETHANE AND POLYISOCYANURATE FOAMS HAVING ENHANCED BENEFITS

This invention deals with a process for preparing rigid polyurethane and polyisocyanurate foams having enhanced benefits.

BACKGROUND OF THE INVENTION

Polyurethane foam insulation is an integral component in residential and commercial building insulation systems and virtually all refrigerators and freezers produced today. Thermal insulating performance is particularly uncompromisable in the light of recent federally mandated reductions in appliance energy consumption. As the industry strives for greater energy efficiency it is now faced with a second environmentally driven issue, that being, the attack of fully halogenated chlorofluorocarbons on the earth's protective ozone layer. International agreement to eventually ban these materials means that the use of certain chlorofluorocarbons such as CFC-11, as a common blowing agent for foamed polyurethane and polyisocyanurate foams, must come to an end. As a key step toward that goal, utilization of carbon dioxide from the water-isocyanate reaction in the foaming formulation as a co-blowing agent will likely play an important role in most rigid polyurethane and polyisocyanurate foam applications in the near future.

The most likely approach to using less chlorofluorocarbons is the use of increased amounts of water in the water-isocyanate reaction to produce carbon dioxide as the blowing agent rather than using chlorofluorocarbons.

However, a number of problems are inherent in the use of high levels of water in foamable systems. Most serious is that certain gases trapped in the cured foam cells decrease the insulating performance of foams. As the chlorofluorocarbons are replaced with carbon dioxide this insulating capacity decreases. Carbon dioxide is a much better conductor of heat energy compared to chlorofluorocarbons. Reduced foam flow during processing will also be observed due to the increased resin viscosity obtained with lower levels of chlorofluorocarbons which tend to act as interim solvents in the foaming formulation. The higher resin viscosity will also result in less efficient component mixing. This will in turn result in processing difficulties and coarser-celled foams. Higher levels of water in the foam formulation also leads to more friable foams which exhibit poor adhesion to the appliance cabinet and to facer materials used in laminated foams, a requirement in the use of the foams in refrigerators and freezers and commercial and residential construction applications. Finally, the proclivity of the carbon dioxide to quickly diffuse out of the polyurethane foam formulation puts greater demands on the structural integrity of the foaming polymer. This will often lead to foam shrinkage as the internal cell pressure in the foam drops due to carbon dioxide effusion from the foaming mixture.

The invention disclosed herein seeks to overcome some of the problems in the prior systems for obtaining polyurethane and polyisocyanurate foams having enhanced benefits.

Thus it is an object of this invention to provide system flowability of the reacting foam mixture.

It is a further object of this invention to provided a foam with an insulating capability equal to the foams that are provided by the chlorofluorocarbon blown systems.

Yet another object of this invention is to provide foams having the requisite density for use in insulating applications. and finally, it is an object of this invention to provide a method of preparing polyurethane and polyisocyanurate foams which are easily demolded.

BRIEF DESCRIPTION OF THE DRAWINGS

FIG. 1 is a full view in perspective of the foam flow testing apparatus used in the examples of this invention.

FIG. 2 is a cross-sectional side view of FIG. 1 through line A—A of FIG. 1 showing a Dixie ® cup in place in the apparatus.

THE INVENTION

Thus, there is provided herein a process of preparing a rigid polyurethane and polyisocyanurate foam said method comprising: (I) mixing a formulation comprising: (i) at least one reactive diisocyanate; (ii) at least one reactive polyol; (iii) at least one catalyst; (iv) an organic blowing agent; (v) water, and (vi) a polyurethane foam additive having the following general formula

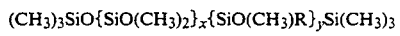

wherein R is $-(C_nH_{2n})O(CH_2CH_2O)_w\{CH_2(CH_3)CHO\}_zR'$ wherein R' is selected from a group consisting of $-(C=o)R''$, hydrogen, alkyl radicals having 1 to 6 carbon atoms, and $-R''$, wherein R'' is selected from a group consisting of alkyl radicals having from 1 to 6 carbon atoms, n has a value of 3 to 6, x has a value of 27 to 33, y has a value of 3 to 5, z has a value of 0 or 1, and w has a value of 6 to 100; wherein the ratio of x to y is in the range of 5 to 12:1 and the amount of organic blowing agent (iv) does not exceed the amount of water (v) in the incipit mixture; (II) allowing the incipit mixture to react and cure whereby a rigid polyurethane and polyisocyanurate foam is obtained.

The art is replete with examples of polyurethane foam additives that are based on silicone polymers co-reacted with polyalkyleneoxides. A general class of non-hydrolyzable silicone surfactants based upon copolymers of polydimethylsiloxane and polyalkyleneoxides are those represented by the general formula

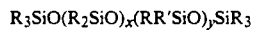

wherein R is generally alkyl and R' represents $-(CH_2)_nO(R'')_a(R''')_bR^{iv}$, wherein R' is ethylene oxide units, R''' is propylene oxide units and $R^{iv}$ is an endblocker, and wherein x, y, a, n, and b are each the number of repeating units, respectively.

A wide range of properties can be achieved by varying the structural features of these surfactants, as can be witnessed by studying the many patents in this prior art field. Turning now to the detailed description of the invention, this invention relates to the use of excess water and certain closely defined surfactant block copolymers of polysiloxanes and polyalkylene oxides in the preparation of rigid polyurethane and polyisocyanurate foams having enhanced physical properties, in which the blocks of polymer are tied together through silicon carbon bonds. The term "excess water" as used herein means that there is more water in the incipit foamable formulation, with relation to the amount of other ingredients in the foamable formulation, than is normally present in rigid foam formulations.

The surfactants useful in this invention have the general formula $$(CH_3)_3SiO\{SiO(CH_3)_2\}_x\{SiO(CH_3)R\}_ySi(CH_3)_3$$

wherein R is $-(C_nH_{2n})O(CH_2CH_2O)_w\{CH_2(CH_3)CHO\}_zR'$. For purposes of this invention, the value of x is 27 to 33 and the value of y is 3 to 5. Surfactants that have values substantially outside of these values do not work well in the process of this invention. For example, when the value of x is below about 27, the flow properties of the foam in which the surfactant is used are substantially decreased, while x values above 33 give high flow values, but reduce the structural integrity of the resulting foam. Further, for purposes of this invention, the ratio of x to y must be in the range of 5 to 12:1. Values substantially outside of this range do not give the desired rigid foams when excess water is used in the foam formulation as can be observed by a study of the examples herein which compare certain commercial surfactants that are currently used in the manufacture of rigid polyurethane and polyisocyanurate foam in conventional rigid foam formulations.

With regard to the values of w and z, the successful preparation of commercially useable rigid foams from the process of this invention requires that the value of w should be from 6 to 100 and the value of z should be from 0 to 1. In other words, small amounts of propylene oxide in the alkylene oxide copolymer can be tolerated. The preferred alkylene oxide for use in this invention is ethylene oxide, and the preferred value of w is about 9 to about 35, with the most preferred value of w being in the range of 8 to 20.

The value of n in this invention is not critical and can vary from 2 to about 8. However, the preferred value of n is 3 or 4 and the most preferred value of n is 3.

For purposes of this invention, R' can be any radical $-(C=O)R''$, in which R'' is selected from methyl, ethyl, or butyl or can be hydrogen as alkyl radicals having 1–6 carbon atoms.

The most important aspect of the process of this invention is the blowing agent that is utilized therein. For purposes of this invention, the amount of water used in the process must exceed the amount of organic blowing agent in the incipit mixture. In this invention, the word "incipit" takes it dictionary meaning and it indicates that the amounts of materials in the formulation are those that are put into the mixing container before the reaction of the isocyanates with the water and polyol commences.

Also included in the formulation of the process of this invention are conventional foam formulation materials such as reactive diisocyanates, reactive polyols, catalysts, organic blowing agents, among other additives and adjuvants that have been found useful in the art to prepare rigid polyurethane and polyisocyanurate foams.

Thus, the process comprises mixing a formulation comprising conventional rigid foam ingredients such as at least one conventional reactive diisocyanate, at least one conventional reactive polyol, at least one conventional catalyst, and at least one conventional organic blowing agent, along with water, and the novel surfactants of this invention, wherein as long as the ratio of polydimethylsiloxane units to methyl R siloxane units in the surfactant is in the range of 5 to 12, and further, if the amount of water in the incipit mixture of foam ingredients exceeds the amount of organic blowing agent, then the incipit mixture will react and cure and give a rigid polyurethane and polyisocyanurate foam having enhanced physical properties, while reducing the amount of harmful chlorofluorocarbons that are conventionally used in rigid polyurethane foam manufacturing.

Preparation of the Siloxane/Polyalkyleneoxide Copolymer Surfactants

All of the surfactants used in the examples were prepared by hydrosilylation of the allyloxy, or vinyloxy endblocked polyethers, using platinum as the catalyst, according to standard procedures known in the art.

Foam Formulations

All of the foam formulations used in the examples herein were selected from the following four formulations wherein "pphp" means "parts per hundred polyol", wherein polyol means the organic polyether reactant in each formulation, for example, in (A) it is Voranol ® 490 polyol.

| (A.) | ¹Voranol 490 polyol | 100.00 | pphp |
|---|---|---|---|
|  | T-131 Catalyst | 0.08 |  |
|  | 33 LV Catalyst | 2.00 |  |
|  | BL-19 Catalyst | 0.80 |  |
|  | Water | 4.50 |  |
|  | Rubinate ® M or Mondur ® MR | 204.26 |  |
| (B.) | Voranol 490 polyol | 100.00 |  |
|  | Polycat 7 Catalyst | 2.60 |  |
|  | Dabco ® DC 2 Catalyst | 0.40 |  |
|  | Water | 4.50 |  |
|  | CFC - 11 | 25.00 |  |
|  | Rubinate ® M or Mondur ® MR | 204.26 |  |
| (C.) | Voranol 490 polyol | 100.00 |  |
|  | Polycat 8 Catalyst | 4.20 |  |
|  | Water | 4.50 |  |
|  | CFC-11 | 25.00 |  |
|  | Rubinate ® M or Mondur ® MR | 204.26¹ |  |

¹Voranol ® Dow Chemical Company, Midland, MI
T-131 Air Products, Allentown, PA
33LV Air Products, Allentown, PA
BL19 Air Products, Allentown, PA
Polycat 7 Air Products, Allentown, PA
Dabco DC2 Air Products, Allentown, PA
Ruhinate ® M ICI, West Deptford, NJ
Mondur ® MR Mobay, Pittsburg, PA
CFC-11 Dupont, Wilmington, DE L-Panel Foam Test Procedure A master batch of polyol, catalyst(s) and water is initially prepared according to the particular foam formulation that is desired. The formulation was prepared in a cappable bottle and then rolled on a ball mill for 1 hour to afford complete mixing of the components. The designated amount of this masterbatch is then added to an 8 oz. French square bottle, and the appropriate amount of CFC-11 is added. The bottle is capped tightly and the mixture is then clamped to and mixed on an air driven wheel apparatus for 20 minutes to complete the preparation of the polyol premix. When completely mixed the mixture is stored in a 20° C. incubator until it clears.

|  | Polyol Premix Compositions | | |
|---|---|---|---|
|  | A | B | C |
| Masterbatch | 121.67 gms. | 121.69 gms. | 121.95 gms. |
| CFC-11 | 28.33 gms. | 28.31 gms. | 28.05 gms. |

FIG. 1 shows a full front view in perspective of the foam flow testing apparatus 1 for the examples used in this invention. The apparatus 1 is essentially a mold to hold and confine a reacting and foaming mixture. With regard to FIG. 1, there is shown the segment 10 and the segment 20, further defined below, and the clamping system used to hold the apparatus together, wherein the clamps 17 are shown in place.

As shown in FIG. 2, the apparatus 1 consists of a back 2 and a bottom 3 which are securely connected together at point P to form a first L-shaped structure 10. A front 4 and top 5 are securely connected together at point P' to form an second L-shaped structure 20 which itself has a top 6 and a front 7 and a side 7'. The apparatus 1 optionally has legs 8 which must be long enough to raise the apparatus 1 from the surface of a table or the like so that the apparatus can be used with a cup holder 15 and a Dixie ® cup 16. In the alternative, the apparatus 1 can be used without legs, in a situation where the L-shape structure 10 is placed on a table or other flat surface with the portion of the L-shaped structure holding the Dixie ® cup hanging out over said surface.

The L-shaped surface 20 has through the approximate center of its top 5, a circular hole 9, covered by a hinged cap 11, the hinge designated therein as 12. The cap has a latch 13, which must be strong enough to hold the cap 11 in place during the foaming reaction. The hole 9 is large enough to allow the passage of the cup holder 15 and the Dixie ® cup 16 for placement in the hole 14 below.

Shown in FIG. 2 is the second circular hole 14, which is shown in the Figure as containing a cup holder 15 and a Dixie ® cup 16. The cup holder 15 is slightly larger at its top than the diameter of the hole 14 and the cup holder 15 is slightly rolled at its upper edge to make sure that the cup holder 15 does not slip through the hole 14. In use, the segment 10 is fitted to the segment 20 and securely clamped (as indicated in the discussion of FIG. 1). The interface of the contact between the two segments is indicated by the line P''—P''. The apparatus 1 is then placed in an oven to bring it to the testing temperature.

The 8 oz. French square bottle is then removed from the incubator. The L-Panel is placed in close proximity to the mixer used for mixing the ingredients. The panel had, in each case, been preheated in an oven set at 140° C. to keep the reaction temperature constant within the cavity of the panel. The designated amount of polyol premix is then weighed into a 32 oz. Dixie ® cup. The appropriate amount of surfactant is then added to the cup wherein for the samples herein, 1 gm. of surfactant is equal to 1 pphp. The designated weight of isocyanate is then added to the cup from a tared 250 ml glass beaker. The components are mixed in a 32 oz. Dixie ® cup for 6 seconds. The cup is then quickly inserted into the hole in the base of the L-panel and is situated such that the cup passes through the hinged opening and the lip of the cup rests inside the mold in the bottom of the base. The hinged door is then closed to contain the rising foam and force it into the open area of the L-panel, and vertically.

| Polyol Premix Compositions | | | |
|---|---|---|---|
| Polyol premix | 127.8 | 132.5 | 133.7 |
| Surfactant | | (variable - pphp) | |
| Methylene | 197.2 | 192.3 | 192.3 |

| Polyol Premix Compositions |
|---|
| Diisocyanate |

The foam is allowed to cure for 15 minutes in the mold. The back of the mold is then removed and the foam taken out. The mold is then reinserted in the oven for the next test. The maximum height of the vertical portion of the foam is measured and is an indication of the flow properties of the foaming mass. One hour after the foam has been mixed, a 7 in. × 7 in. × 7 in. square is cut from the center of the vertical leg of the foam. K-factor measurements are made on this sample utilizing an Anacon Model 88 K-factor measuring instrument. Density measurements are also determined from this sample. For this test, one simply cuts a 7″ × 7″ × 1½″ square from the vertical leg of the L-panel, and weighs it. The actual length, width and height are measured and the volume calculated according to the formula length × width × heighth. The weight is then divided by the volume to get the density and it is reported in pounds per cubic foot.

EXAMPLE 1

Four sample surfactants were prepared according to the above, in which samples:

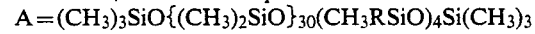
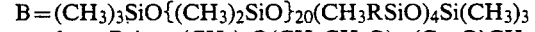

$C = (CH_3)_3SiO\{(CH_3)_2SiO\}_{30}(CH_3RSiO)_4Si(CH_3)_3$
where R is

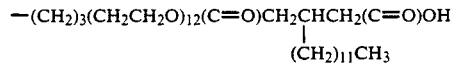

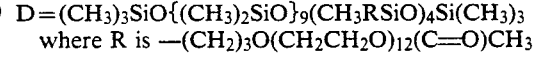

Samples A and C are within the scope of this invention. Samples B and D are outside the scope of this invention because sample B has only 20 polydimethylsiloxane units and sample D has only 9 polydimethylsiloxane units. The samples were tested using three different levels of surfactant so that processing latitude can be observed for the samples A and C as compared to Sample B and D. The results are on Table 1 wherein it can be observed that A and C give the beneficial results according to the instant invention.

The K-Factor is expressed in British Thermal Units-in/hour-feet squared-°F.

TABLE I

| Sample | surfact. level (pphp) | Foam Height (mm) | K-Factor |
|---|---|---|---|
| A | 0.4 | 544 | 0.136 |
|   | 0.8 | 558 | 0.135 |
|   | 1.2 | 570 | 0.134 |
| B | 0.4 | 496 | 0.162 |
|   | 0.8 | 549 | 0.137 |
|   | 1.2 | 564 | 0.136 |
| C | 0.4 | 515 | 0.144 |
|   | 0.8 | 525 | 0.139 |
|   | 1.2 | 525 | 0.138 |
| D | 1.2 | 488 | 0.152 |

EXAMPLE 2

Several commercial surfactants that are used for rigid polyurethane and polyisocyanurate foam preparation were prepared and used in the excess water foam formulation set forth herein. This example uses a standard siloxane polymer for the surfactants while varying the polyether structure to show the effect of the polyether on the resulting foam. None of the surfactants shown in this example fall within the scope of the invention, however, this example illustrates that conventional commercial surfactants are not useful in this invention, and further, this example illustrates that one cannot just match the polyether structure of the surfactants of the instant invention and gain the advantages of the use of the surfactants in the process of the instant invention.

The siloxane polymer used herein was $(CH_3)_3SiO\{(CH_3)_2SiO\}_9(CH_3RSiO)_4Si(CH_3)_3$ wherein the values of 9 and 4 are averages.

| Sample | Structure of R |
|---|---|
| E | $-(CH_2)_3O(CH_2CH_2O)_{12}H$ |
| F | $-(CH_2)_3O(CH_2CH_2O)_{12}(C=O)CH_3$ |
| G | $-(CH_2)_3(CH_2CH_2O)_7H$ |
| H | $-(CH_2)_3O(CH_2CH_2O)_{12}(C=O)CH_2CHCH_2(C=O)OH$<br>                                                              $(CH_2)_{11}CH_3$ |
| I | $-(CH_2)_3O(CH_2CH_2O)_{10.5}(CH_2CHO)_{3.5}H$<br>                                                      $CH_3$ |
| J | $-(CH_2)_3O(CH_2CHO)_{3.7}(CH_2CH_2O)_{10.5}H$<br>                     $CH_3$ |
| K | $-(CH_2)_3O(CH_2CH_2O)_{10.5}(CH_2CHO)_{3.5}H$<br>                                                         $CH_2CH_3$ |
| L | $-(CH_2)_3O(CH_2CHO)_{3.5}(CH_2CH_2O)_{10.5}H$<br>                     $CH_2CH_3$ |
| M | $-(CH_2)_3O(CH_2CH_2O)_{12}(CH_2CHO)_{2.1}H$<br>                                            $CH_2CH_3$ |
| N | $-(CH_2)_3O(CH_2CHO)_{2.2}(CH_2CH_2O)_{12.2}H$<br>                 $CH_2CH_3$ |

Using these surfactants in the foam testing, the results following on TABLE II were obtained. These results clearly show that one cannot merely emulate the polyether segment of the commercial rigid polyurethane surfactants and get the desired results in the excess water foam formulation.

TABLE II

| SAMPLE | K-FACTOR (btu-in/hr-ft2-°F.) | DENSITY (pcf) |
|---|---|---|
| E | 0.155 | 1.32 |
| F | 0.277 | 1.32 |
| G | 0.162 | 1.30 |
| H | 0.165 | 1.34 |
| I | 0.173 | 1.30 |
| J | 0.186 | 1.30 |
| K | 0.158 | 1.29 |
| L | 0.166 | 1.31 |
| M | 0.165 | 1.30 |
| N | 0.176 | 1.30 |

None of these materials yielded a surfactant which possessed both of the key properties. For example, when tested for flow properties, Surfactant F yielded the highest flow value but at the expense of the K-Factor. Surfactant E, when tested for flow, yielded a good relative K-Factor yet had only a marginal flow value.

EXAMPLE 3

Several commercial surfactants that are used for rigid polyurethane and polyisocyanurate foam preparation were prepared and used in the excess water foam formulation set forth herein. This example uses a standard polyether polymer for the surfactants while varying the polysiloxane structure with regard to the ratio of polydimethylsiloxane unit to polymethyl R units, along with varying molecular weights, to show the effect on the resulting foam. None of the surfactants shown in this example fall within the scope of the invention, however, this example illustrates that conventional commercial surfactants are not useful in this invention, and further, this example illustrates that one cannot just match the polysiloxane structure of the surfactants of the instant invention and gain the advantages of the use of the surfactants in the process of the instant invention. The polyether polymer R used in this example was $-(CH_2)_3O(CH_2CH_2O)_{12}(C=O)CH_3$. The siloxanes are set forth in TABLE III. Samples O, R, and U are replications of the same siloxane structure to get a statistical expression for the repeatability of the surfactant's performance in the test procedures.

TABLE III

| SAMPLE | STRUCTURE | MOL. WEIGHT |
|---|---|---|
| O | $(CH_3)_3SiO\{(CH_3)_2SiO\}_{30}(CH_3RSiO)_{11}Si(CH_3)_3$ | 3048 |
| P | $(CH_3)_3SiO\{(CH_3)_2SiO\}_{20}(CH_3RSiO)_4Si(CH_3)_3$ | 1886 |
| Q | $(CH_3)_3SiO\{(CH_3)_2SiO\}_{40}(CH_3RSiO)_4Si(CH_3)_3$ | 3368 |
| R | $(CH_3)_3SiO\{(CH_3)_2SiO\}_{30}(CH_3RSiO)_{11}Si(CH_3)_3$ | 3048 |
| S | $(CH_3)_3SiO\{(CH_3)_2SiO\}_{20}(CH_3RSiO)_{18}Si(CH_3)_3$ | 2727 |
| T | $(CH_3)_3SiO\{(CH_3)_2SiO\}_{40}(CH_3RSiO)_{18}Si(CH_3)_3$ | 4210 |
| U | $(CH_3)_3SiO\{(CH_3)_2SiO\}_{30}(CH_3RSiO)_{11}Si(CH_3)_3$ | 3048 |

Using these surfactants in the foam testing, the results following on TABLE IV were obtained. These results clearly shown that one cannot merely emulate the polysiloxane segment of the commercial rigid polyurethane surfactants and get the desired results in the excess water foam formulation.

TABLE IV

| SAMPLE | K-FACTOR (btu-in/hr-ft2-°F.) | DENSITY (pcf) | FOAM HT. mm |
|---|---|---|---|
| O | 0.152 | 2.11 | 513 |
| P | 0.137 | 2.02 | 582 |
| Q | 0.138 | 2.05 | 568 |
| R | 0.158 | 2.19 | 495 |
| S | 0.240 | 3.30 | 300 |
| T | 0.162 | 2.68 | 394 |

TABLE IV-continued

| SAMPLE | K-FACTOR (btu-in/hr-ft2-°F.) | DENSITY (pcf) | FOAM HT. mm |
|---|---|---|---|
| U | 0.165 | 2.22 | 488 |

EXAMPLE 4

Several additional surfactants were prepared to evaluate the type of endcapping that could be tolerated on the polyether segment. The surfactants used a standard polysiloxane having the formula:

$(CH_3)_3SiO\{(CH_3)_2SiO\}_{20}(CH_3RSiO)_4Si(CH_3)_3$ The polyether segments were varied in these examples and they had the formulae set forth in TABLE V. Especial note should be made of the capping groups on the polyethers.

Using these surfactants in the foam testing, the results following on TABLE VI were obtained. These results clearly show that one cannot merely emulate the endcapping segment of the commercial rigid polyurethane surfactants and get the desired results in the excess water foam formulation.

TABLE V

| SAMPLE | POLYETHER STRUCTURE | ENCAP |
|---|---|---|
| V | $-(CH_2)_3O(CH_2CH_2O)_{12}-$ | $(C=O)CH_3$ |
| W | $-(CH_2)_3O(CH_2CH_2O)_{10.5}(CH_2CHO)_{3.5}-$<br>$\quad\quad\quad\quad\quad\quad\quad\quad\quad\quad\quad\quad\vert$<br>$\quad\quad\quad\quad\quad\quad\quad\quad\quad\quad\quad\quad CH_3$ | H |
| X | $-(CH_2)_3O(CH_2CH_2O)_{10.5}(CH_2CHO)_{3.5}-$<br>$\quad\quad\quad\quad\quad\quad\quad\quad\quad\quad\quad\quad\vert$<br>$\quad\quad\quad\quad\quad\quad\quad\quad\quad\quad\quad\quad CH_3$ | $(C=O)CH_3$ |
| Y | $-(CH_2)_3O(CH_2CH_2O)_{10.5}(CH_2CHO)_{3.5}-$<br>$\quad\quad\quad\quad\quad\quad\quad\quad\quad\quad\quad\quad\vert$<br>$\quad\quad\quad\quad\quad\quad\quad\quad\quad\quad\quad\quad CH_3$ | R |

$R = (C=O)CH_2CHCH_2(C=O)H$
$\quad\quad\quad\quad\quad\vert$
$\quad\quad\quad\quad(CH_2)_{11}CH_3$

TABLE VI

| SAMPLE | K-FACTOR (btu-in/hr-ft2-°F.) | DENSITY (pcf) | FLOW mm |
|---|---|---|---|
| V | 0.134 | 2.02 | 553 |
| W | 0.141 | 2.12 | 506 |
| X | 0.140 | 2.11 | 522 |
| Y | 0.137 | 2.07 | 516 |

EXAMPLE 5

A comparison of commercial surfactant E from TABLE I above was made against a surfactant prepared within the scope of the claims i.e. surfactant A, in the three foam formulations set forth above in the FOAM FORMULATIONS section. The results are found on TABLE VII.

TABLE VII

| SAMPLE | FOAM FLOW FOAM FORM. | | | FOAM K-FACTOR FOAM FORM. | | | FOAM DENSITY FOAM FORM. | | |
|---|---|---|---|---|---|---|---|---|---|
| | (A.) | (B.) | (C.) | (A.) | (B.) | (C.) | (A.) | (B.) | (C.) |
| A | 605 | 596 | 618 | 0.124 | 0.147 | 0.144 | 1.96 | 1.99 | 1.99 |
| E | 503 | 492 | 520 | 0.150 | 0.153 | 0.175 | 2.07 | 2.07 | 2.14 |

That which is claimed is:

1. A process of preparing a rigid polyurethane and polyisocyanurate foam said method comprising:
   (I) mixing a formulation comprising:
   (i) at least one reactive diisocyanate;
   (ii) at least one reactive polyol;
   (iii) at least one catalyst;
   (iv) an organic blowing agent;
   (v) water, and
   (vi) a polyurethane foam additive having the following general formula $(CH_3)_3SiO\{SiO(CH_3)_2\}_x\{SiO(CH_3)R\}_ySi(CH_3)_3$ wherein
   R is $-(C_nH_{2n})aO(CH_2CH_2O)_w\{CH_2(CH_3)CHO\}_zR'$ wherein R' is selected from a group consisting of $-(C=O)R''$, hydrogen, alkyl radicals having from 1 to 6 carbon atoms, and $-R''$, wherein R'' is selected from a group consisting of alkyl radicals having from 1 to 6 carbon atoms
   n has a value of 3 to 6,
   x has a value of 27 to 33,
   y has a value of 3 to 5,
   z has a value of 0 or 1, and
   w has a value of 6 to 100;
   wherein the ratio of x to y is in the range of 5 to 12:1 and the amount of organic blowing agent (iv) does not exceed the amount of water (v) in the incipit mixture;
   (II) allowing the incipit mixture to react and cure whereby a rigid polyurethane and polyisocyanurate foam having an enhanced system flow and K-factor values are obtained.

* * * * *